United States Patent
Moulton, Jr. et al.

(10) Patent No.: US 12,142,177 B2
(45) Date of Patent: Nov. 12, 2024

(54) DYNAMIC INFRARED SCENE GENERATION AND PROJECTION SYSTEM AND METHODS

(71) Applicant: JRM Enterprises, Inc., Orlando, FL (US)

(72) Inventors: J. Russ Moulton, Jr., Orlando, FL (US); Steve Butrimas, Orlando, FL (US); Christopher Fink, Orlando, FL (US); Dan Bybee, Orlando, FL (US); Isaac Ehlers, Orlando, FL (US); William Hilton, Orlando, FL (US)

(73) Assignee: JRM Enterprises, Inc., Orlando, FL (US)

( * ) Notice: Subject to any disclaimer, the term of this patent is extended or adjusted under 35 U.S.C. 154(b) by 0 days.

(21) Appl. No.: 18/447,106

(22) Filed: Aug. 9, 2023

(65) Prior Publication Data

US 2024/0212542 A1    Jun. 27, 2024

Related U.S. Application Data

(63) Continuation-in-part of application No. PCT/US2022/038395, filed on Jul. 26, 2022.
(Continued)

(51) Int. Cl.
| | |
|---|---|
| *G09G 3/02* | (2006.01) |
| *F41G 3/16* | (2006.01) |
| *G01J 5/00* | (2022.01) |

(52) U.S. Cl.
CPC ............... *G09G 3/02* (2013.01); *F41G 3/165* (2013.01); *G01J 2005/0077* (2013.01)

(58) Field of Classification Search
CPC ..... G09G 3/02; F41G 3/165; G01J 2005/0077
See application file for complete search history.

(56) References Cited

U.S. PATENT DOCUMENTS

| | | | |
|---|---|---|---|
| 6,611,546 B1 * | 8/2003 | Garnache | ............... H01S 5/141 |
| | | | 372/92 |
| 8,899,886 B1 * | 12/2014 | Castle | .................... B23B 49/00 |
| | | | 700/192 |

(Continued)

FOREIGN PATENT DOCUMENTS

WO    WO2023/048818 A2    3/2023

OTHER PUBLICATIONS

Cooper; Spatially resolved surface temperature control using scanned laser heating; Doctoral dissertation; Stanford University; 2002; 114 pages; retrieved from the internet (https://www.proquest.com/openview/9e25dabf1b1eb8408e842c6a1ccec8e8/1?pq-origsite=gscholar&cbl=18750&diss=y) on Apr. 16, 2024.

(Continued)

*Primary Examiner* — David A Vanore
(74) *Attorney, Agent, or Firm* — Shay Glenn LLP

(57) ABSTRACT

A dynamic infrared (IR) scene generation system comprising a thin-film screen configured to react to contact by an IR laser; a laser scanning system configured to contact the thin-film screen with laser beam, the laser scanning system comprising a laser scanner, one or more modulators, and an IR laser source; and an image processing system operably connected to a controller configured to control the laser scanning system based on data from the image processing system, wherein the laser scanning system can be configured to contact the thin-film screen with the IR laser based on an IR scene input.

19 Claims, 10 Drawing Sheets

Related U.S. Application Data

(60) Provisional application No. 63/225,929, filed on Jul. 26, 2021.

(56) References Cited

U.S. PATENT DOCUMENTS

| | | | | |
|---|---|---|---|---|
| 8,927,935 B1* | 1/2015 | Meline | ............... | F41H 13/0062 |
| | | | | 250/340 |
| 10,215,553 B2* | 2/2019 | Nawasra | ............... | G01B 11/00 |
| 10,802,120 B1* | 10/2020 | LaChapelle | ........... | G01S 7/4917 |
| 2003/0164461 A1* | 9/2003 | Kelly, Jr. | ............... | F41G 7/004 |
| | | | | 250/504 R |
| 2003/0213923 A1* | 11/2003 | Kongable | ............... | G01J 5/53 |
| | | | | 250/504 R |
| 2007/0206177 A1* | 9/2007 | Anschel | ............ | F41H 13/0056 |
| | | | | 356/28 |
| 2009/0249521 A1* | 10/2009 | Dazzi | ................... | B82Y 35/00 |
| | | | | 356/51 |
| 2010/0213367 A1* | 8/2010 | Miller | ................... | G01N 1/405 |
| | | | | 436/175 |
| 2010/0289632 A1* | 11/2010 | Seder | .................... | G06V 10/95 |
| | | | | 382/104 |
| 2012/0075168 A1* | 3/2012 | Osterhout | ............... | G06F 3/017 |
| | | | | 345/8 |
| 2012/0194550 A1* | 8/2012 | Osterhout | ............... | G06F 1/163 |
| | | | | 345/633 |
| 2012/0212484 A1* | 8/2012 | Haddick | ................ | G06Q 30/02 |
| | | | | 345/419 |
| 2012/0235883 A1* | 9/2012 | Border | ................... | G06F 3/017 |
| | | | | 345/8 |
| 2012/0235884 A1* | 9/2012 | Miller | ..................... | G06F 3/013 |
| | | | | 345/8 |
| 2012/0242697 A1* | 9/2012 | Border | ................ | G02B 27/017 |
| | | | | 345/633 |
| 2012/0281996 A1* | 11/2012 | Chen | ...................... | G02B 26/10 |
| | | | | 399/51 |
| 2013/0048884 A1* | 2/2013 | Fainchtein | ................ | H01J 1/14 |
| | | | | 250/504 R |
| 2013/0314303 A1* | 11/2013 | Osterhout | ............... | G06F 3/013 |
| | | | | 345/8 |
| 2015/0016777 A1* | 1/2015 | Abovitz | ............ | G02B 27/0093 |
| | | | | 385/37 |
| 2017/0060004 A1* | 3/2017 | Hendel | ............... | G03F 7/70558 |
| 2018/0020922 A1* | 1/2018 | Liu | ........................ | A61B 5/145 |
| | | | | 600/300 |
| 2022/0043127 A1* | 2/2022 | LaChapelle | ............ | G01S 7/484 |
| 2022/0334231 A1* | 10/2022 | Shah | ....................... | G01S 17/26 |

OTHER PUBLICATIONS

Yaradanakul et al.; Uncooled infrared microbolometers on a flexible substrate; IEEE Transactions on Electron Devices; 49(5); pp. 930-933; May 2002.

* cited by examiner

DYNAMIC INFRARED SCENE GENERATION AND PROJECTION SYSTEM AND METHODS

CLAIM OF PRIORITY

The present application is a continuation-in-part of International Application No. PCT/US2022/038395 entitled "DYNAMIC INFRARED SCENE GENERATION AND PROJECTION SYSTEM AND METHODS" filed on Jul. 26, 2022, which claims the benefit of U.S. Provisional Patent Application No. 63/225,929 entitled "UNCOOLED LIVE-FIRE INFRARED SCENE PROJECTION SYSTEM" filed on Jul. 26, 2021, the contents of which are hereby incorporated in its entirety for all purposes.

STATEMENT AS TO FEDERALLY SPONSORED RESEARCH

This invention was made with government support under Department of Defense, Army Contracting Command awarded by SBIR contract number W900KK19C0047. The government has certain rights in the invention.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The present invention relates to the field of thermal sensor scene projection. In particular, dynamic Infrared Scene Projection (IRSP) for targeting systems and weapons training can operate using on one or more characteristics of a proposed target.

BACKGROUND

Infrared scene projection systems perform a vital role in the testing of tactical and theatre weapons systems. Weapon targeting systems often rely on one or more attributes of a proposed target (e.g., thermal signatures). Technological advancements have been limited and fail to provide a solution for providing dynamic and/or unique scene generation that may be used as a target for training weapons systems. Current non-collimated field IR Scene Projection relies on crude static cutouts using plywood consisting of thermal heating pads to create a "hot-spot" by being affixed to plywood as "pop-up" silhouettes to represent static-aspects of vehicles and their thermal signatures. These current Long Wave Infrared (LWIR) target systems employed at live-fire ranges lack the fidelity to support recognition, classification, and identification of the target.

In addition to a scene visual signature, dynamic thermal attributes can be necessary to identify strategic engagement opportunities with a target. The current state of the art employs crude cartoon-like hot-spots based on manual placement of the thermal heating pads on or around the plywood cutout. There has been an overall failure in the art to provide any opportunity for dynamic and/or strategic identification of an optimal engagement location on the target.

Attempts have been made to generate an image using a laser system in place of the thermal heating pads. For example, cooled lasers have been used to generate a static hot-spot in a background of a small screen, with a cryogenically cooled thermal sensor to monitor the hot-spot viewed from the back side of the screen (Cooper, Susan and Eaton, John; Spatially Resolved Surface Temperature Control Using Scanned Laser Heating. Dept. of Mechanical Engineering of Stanford University. August 2002). The laser systems described therein were limited to uniform hot-spot incapable and prohibitive of dynamic scene generation and control. Additionally, Cooper and the current state of the art fail provide expendable and/or low-cost, "life size" target screens that do not require the use of collimators, resolved, high-spatial resolutions targets in complex backgrounds, dynamically changing target thermal signatures, automatic image registration for closed-loop image refinement, front-screen viewing for "live fire" use, and/or "hit" detection system, etc.

For these reasons, it would be desirable to provide improved systems and methods for dynamic target and scene generation. It would be particularly desirable to provide cost-effective systems and assemblies for realistic life-size dynamic scene generation. At least some of these objectives will be met by the various embodiments that follow.

SUMMARY OF THE DISCLOSURE

Described herein are systems and methods for dynamic infrared scene generation and projection.

Generally, a dynamic infrared (IR) scene generation system can comprise a thin-film screen configured to react to contact by an IR laser; a laser scanning system configured to contact the screen with laser beam, the laser scanning system comprising one or more laser scanners, one or more modulators, and an IR laser source; an image processing system operably connected to a controller configured to control the laser scanning system based on data from the image processing system, wherein the laser scanning system can be configured to contact the screen with the IR laser based on an IR scene input.

In some examples, the system can comprise a closed feedback system configured to validate a thermal target signature acquired by a thermal imager. The thermal target signature can be a dynamic scene based on the screen reaction to contact by the IR laser. In some examples, the image processing system can be configured to correct one or more pixel intensities of a IR scene input, wherein the image processing system can comprise one or more drivers configured to generate data based on the IR scene input, wherein controller can be configured to control the laser scanning system based on the data.

In some examples, the system further comprises a thermal imager operably connected to the image processing system, the thermal imager can be configured to acquire one or more images from the screen, wherein the one or more images can be configured to be adjusted by the controller based on adjustment data from the image processing system, wherein the adjustment data can be associated with the one or more acquired images. The laser scanning system can be configured to generate one or more thermally dynamic images on the screen, wherein each of the one or more thermally dynamic images can be targetable by a weapon system.

In some examples, the screen can be a multilayer screen comprising a polymer-based film contactable by the IR laser, and a backing (e.g., a coating or a fabric) that can be configured to optimally emit and dissipate heat from the laser absorbed by the thin-film. In some examples, the system comprises a hit detection system in operable communication with the thermal imager, the hit detection system can comprise one or more radio frequency sensors, one or more electromagnetic sensors, or one or more identification sensors. In some examples, one or more physics-based algorithms can be executed in a computing system. The one or more physics-based algorithms can be configured to generate the IR scene input, wherein the generated IR scene input can be configured to have one or more thermally dynamic attributes based on the one or more physics-based algorithms. In some examples, the laser scanning system can be uncooled.

Generally, a method of dynamic infrared (IR) scene generation with an uncooled collimated laser can comprise first generating an IR scene input. Then, an image processing system generating data based on the IR scene input. Then, initiating a laser scanning system comprising a laser scanner, wherein a controller can direct operations of the laser scanning system based on the generated data. Then, contacting a thin-film screen with a laser beam directed by the laser scanner. Then, generating a target signature on the screen, wherein the laser scanner can scan the laser beam on the screen based on the IR scene input.

In some examples, a method described herein can further comprise acquiring a thermal image emitted by the screen with an IR thermal imager. Then, validating the acquired thermal image against the IR scene input, wherein if the acquired thermal image fails validation, the method can further comprise processing the acquired thermal image with the image processing system and adjusting one or more system components based on adjustment data generated by the image processing, the adjustment data can be based on the processed thermal image.

In some examples, the IR scene input comprises a predetermined sequence of one or more simulated dynamic adjustments to one or more regions of the IR scene input, wherein the one or more simulated dynamic adjustment is based on one or more changes in simulated thermal activity of the generated IR scene input. In some examples, a method described herein can further comprise repeating the method in a sequence based on one or more predetermined adjustments in the IR scene input. In some examples, a method described herein can further comprise modulating the laser beam with an acousto-optic modulator, and passing the modulated laser beam through one or more optics before contacting a thin-film screen with a laser beam directed by the laser scanner.

In some examples, the IR scene input can be a video comprising sequential frames, wherein the thermal imager acquires the sequential frames from the video target signature. In some examples, the acquired sequential frames can be validated after all of the sequential frames are acquired, wherein the method further comprises the thermal imager storing sequential frames acquired from the IR scene input video target signature.

In some examples, a method described herein can further comprise detecting a hit with one or more sensors in operable communication with the thin-film screen, wherein a hit is detected when a weapon system acquires the target signature.

In some examples, a method described herein can further comprise the controller adjusting operation of the laser scanning system, wherein the target signature is validated against the IR scene input, wherein the operation of the laser scanning system is adjusted until the target signature passes validation. In some examples, a method described herein can further comprise redirecting a $1^{st}$ order beam from a laser source configured to generate the laser beam, with at least one acousto-optical modulator to a first collimation element, wherein the collimation element directs the $1^{st}$ order beam to the laser scanner.

In general, an uncooled dynamic IR scene generation system can comprise a thin-film screen configured to react when contacted by an IR laser; an IR laser source configured to emit the IR laser; a first acousto-optic modulator configured to direct a 1st order diffraction from the IR laser to a collimation element; a laser scanner configured to direct the 1st order diffraction to the screen; and image processing system operably connected to a controller configured to control the laser scanner, wherein the 1st order diffraction is scanned onto the screen according to an IR scene input from the image processing system.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which.

DETAILED DESCRIPTION

Figure 1:
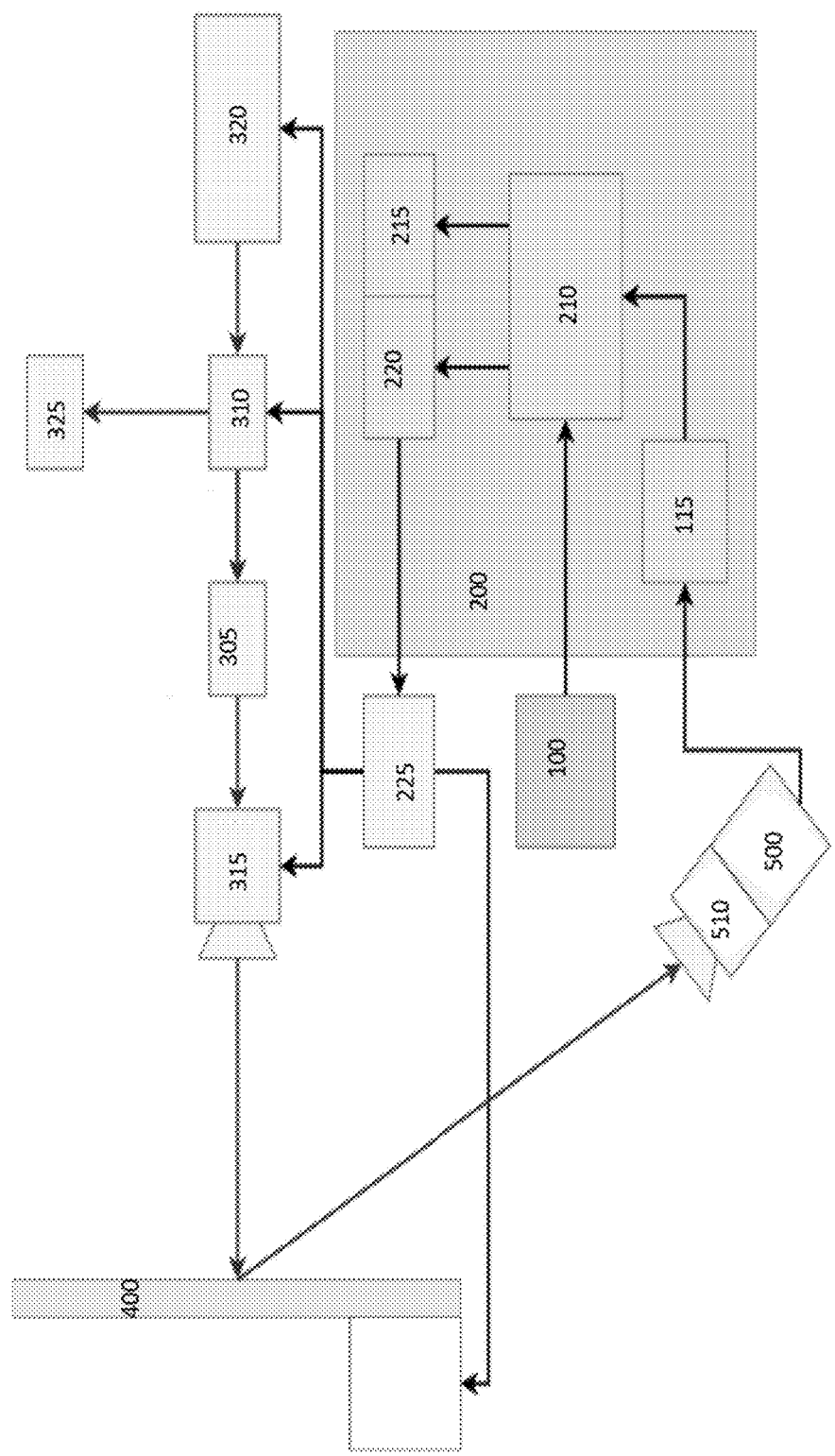
FIG. 1 illustrates a schematic example of an arrangement of system components and an operational flow of generating a dynamic thermal image, as described herein.

A dynamic infrared scene generation and projection system can comprise a screen (e.g., a thermally responsive screen) configured to be selectively activatable on contact from a light source (e.g., a laser). A laser scanning device can be configured to emit energy in an arrangement based on an infrared (IR) scene generated by an infrared scene generator (IRSG) and processed by an image processor system.

The image processing system can transmit scene generation instructions to the laser scanning system. The laser scanning system may comprise a laser system configured to emit an IR laser that can be modulated by one or more modulation devices and transmitted through optics to the laser scanning device for dynamic activation of the thermally responsive screen according to the generated IR scene.

An image acquisition system (e.g., an IR thermal imager) can be in operable communication with the dynamic infrared scene generation and projection system. The image acquisition system can be configured to acquire images displayed on the thermally responsive screen. The image acquisition system can be operably connected to a frame grabber configured to grab or isolate one or more frames from an acquired image for input into the image refinement/image processing system. For example, acquired images and data associated with the dynamic scene generated and displayed on the thermally responsive screen can be transmitted to the image processing system. These images and data may be incorporated into one or more algorithms configured to validate, refine, adjust, optimize, and/or modify, etc. one or more of the systems or components described herein.

The image acquisition system may acquire an image presented on the thermally responsive screen and transmit associated data of the image to the image processing system for comparison of the acquired image (e.g., output image) to the image and/or scene generated by the IRSG. Based on the comparison one or more system components and/or processing functions may be adjusted to ensure optimization of the output image based on the image and/or scene generated by the IRSG.

In some examples, any system described herein may produce a signal or signal product that can be displayed on the thermally responsive screen. In some examples, a screen may comprise materials thermally responsive screen may comprise a material based on optical properties, mechanical properties, chemical properties, and/or thermal properties. For example, optical properties may comprise dielectric constants, dielectric strength, optical resistivity, sheet resistivity, etc. For example, mechanical (e.g., physical) properties may comprise elastic modulus, flexural modulus, flexural strength, maximum allowed stress, tensile strength, surface roughness, etc. For example, thermal properties may comprise coefficient of thermal expansion, heat deflection temperature, specific heat capacity, thermal conductivity, maximum service temperature, etc.

The screen (e.g., thin-film screen) may comprise material configured to react an energy source (e.g., a laser). The screen may comprise a single layer of material such as a film. In some examples, the screen may comprise or multiple layers of material such as film, coatings, paints, fabrics, etc. In some examples, the film may comprise one or more polymers such as a polymer film (e.g., polyimide film). For example, a type of polyimide film may be Kapton® polyimide film.

In some examples, any system described herein may comprise a screen having more than one layer of material. In some examples, one or more layers may not be in physical contact with other layers. In some examples, one or more layers may contact one or more other layers. For example, any system described herein may comprise a multi-layer screen. Any screen described herein may have a first layer comprising a thin film such as polyimide, and a second layer can be configured as a barrier or backdrop material. For example, a second layer of screen may comprise a fabric configured to absorb or substantially absorb heat away from the first layer. The composition of one or more additional layers in communication with the first layer, or otherwise comprising the screen, may be configured to reduce heat reflected from the one or more additional layers and prevent contamination of the image (e.g., scene and/or target) scanned by the laser on the thin-film first layer. Additional layers may be included based on thermal properties of the additional layer material to reduce or eliminate reflection of heat passing through the first layer. For example, one or more additional layers may be configured to absorb or otherwise draw energy (e.g., heat) from the laser scanner that has passed through the first layer to prevent inadvertent heating of the first layer from the side of this layer in communication with the one or more additional layers. In some examples, a single layer screen (e.g., polyimide film) may be configured to receive and react to the thermal energy from a laser (e.g., a scanning laser). The film may have an exterior surface configured to be optically diffuse.

A screen comprising multiple layers may comprise an arrangement of layers of film and coating. For example, the screen may comprise an exterior film layer where a first side of the exterior film layer is the exterior surface of the screen and a second side of the exterior film layer is in contact with a coating. In some examples, the exterior film layer may be in direct contact with an adjacent film layer or indirect contact with another film layer having a coating layer therebetween. In some examples, the exterior surface of the screen may comprise a coating over a film layer, and one or more additional layers of coating, film, or a combination thereof in communication with the film layer. In some examples, the multi-layer screen may comprise alternative layers of film and coating. In some examples, the multi-layer film may comprise a sequence or pattern of film layers and coating layers. For example, a screen may comprise a layer of coating as an exterior surface, where the coating is on a layer of film, then a subsequent layer of coating alternating with film. In some examples, the exterior surface of the screen is a layer of film in communication with a subsequent layer of coating or film, or a combination thereof, with additional layers of film and coating alternating of in a pattern. In some examples, the arrangement of the layers may be configured to absorb, react, reflect, diffuse, etc. or a combination thereof the energy directed to the screen.

In some examples, the screen may comprise one or more layers of optically or thermally reactive material. Each layer may be configured to react to incident energy of different wavelengths. One or more layers may be configured to react to a range of wavelengths or intensities from a laser, as described herein. For example, one layer may be configured to be a narrow-band IR absorption layer. Other layers of the screen may be configured for narrow-band IR, wide-band IR, anti-reflective layers, reflective layers, thermally absorptive layers, etc. or a combination thereof. A layer may be configured to react to predetermined frequencies (e.g., high frequency, low frequency, or a combination thereof). In some examples, one or more layers may be separated by a broadband reflector layer. For example, a layer may be a coating configured to improve the efficiency of the thermally reactive layers by increasing transmission, enhancing contrast, and eliminating ghosting. The screen can be configured based on the spectral range of the scene generation. For example, one or more of the coatings may comprise materials based on the spectral range of the material. One example of a coating material may be a silicon-based coating.

The coatings may also be configured to facilitate communication between layers of film. For example, a layer of coating between two layers of film may be configured to provide a consistent contact between each film layer. The coating may be configured to prevent or remove gas (e.g., air), or other areas between the layers of film that may otherwise not be in consistent communication with each other.

The screen (e.g., a polyimide screen) may be arranged on a structure such as a frame. The frame can be configured to support and/or retain the screen in a predetermined position and location. In some examples, the frame may provide for dynamic adjustment of the screen. For example, the frame may be configured to adjust or otherwise change from a first arrangement or orientation to a second arrangement or orientation (e.g., angle, height, etc.). In some examples, the frame may be collapsible. The frame or any frame components may comprise materials configured to provide structural support to the frame, screen, and any other elements in communication therewith. For example, a frame may comprise wood, metal, polymer, or a combination thereof. In some examples, the frame can provide a mounting surface for the screen. For example, a frame may be a collapsible wooden structure having a substrate (e.g., flat surface) that a screen may be attached, affixed, or otherwise in communication with. The frame may have a flat or substantially flat surface (e.g., a plywood surface) to which a screen or film may be attached. The flat surface may comprise one or more layers of material to accommodate the screen and/or thermal energy from a thermal-emission system including a laser configured to generate an image on or in the screen (e.g., thermally reactive screen material). In some examples, the frame and screen may comprise an assembly of multiple layers including the frame, screen, and one or more layers positioned on top of the screen, between the screen and the frame, and/or behind the frame. For example, a layer may be positioned between the screen and frame. The layer between the screen and frame may comprise known thermal absorption properties. For example, the layer between the screen and frame may be configured with low thermal absorption properties (e.g., foil, coatings, etc.). In some examples, the layer between the screen and frame may be paint or other coating applicable to the surface of the frame or surface of the screen configured to contact the frame.

Some examples of layers for the frame may be a wooden surface (e.g., a single layer of wood), a laminate outer later on the wooden surface, a coating layer (e.g., paint), insulation layer (e.g., a foil insulation layer), etc. or a combination thereof. In some examples, the frame may be configured to receive the screen directly thereon. For example, polyimide film may be coupled directly to the frame with fasteners, adhesive, etc. or a combination thereof.

A shade or awning may be in operable communication with the frame. For example, a shade, awning, or other member configured to reduce or prevent ambient light from contacting the frame and/or screen, may be in operable communication with the frame. In such an example, the shade member may improve the resolution or operation of the thermally-reactive screen (e.g., film) material coupled to the frame.

The frame and/or screen may be configured to diffuse light. For example, the film (e.g., polyimide film, screen) may have a coating, additional layer, surface, etc. configured to be an optical diffuser. In some examples, the frame may comprise an optical diffuser configured to diffuse light in advance of the film positioned thereon. For example, an optical diffusion layer may comprise a rough surface configured to diffuse light. In some examples, the film has an exterior surface or layer configured to diffuse light. The screen can be operably coupled to the system (e.g., the frame) and arranged to receive a continuous scan from a laser scanner. For example, a polyimide film screen may be in operable communication with a laser scanner to receive and be thermally activated by the laser scanner such that a target signature is generated and/or presented on the front of the screen.

Any system described herein may comprise a laser scanner configured to transmit a laser beam onto a screen (e.g. polyimide film). For example, a single optical laser scanner may be configured for step-scanning a laser beam on, across and/or through the screen to generate a target signature based on the scanning of the laser beam on the screen. The laser scanner can be configured to continuously and dynamically scan a laser beam to contact the screen based on the IRSG input image such that the scanning of the laser beam by the laser scanner can result in the presentation of a target signature on the screen. In some examples, the continuous scanning of the laser beam by the laser scanner can provide a dynamic target signature with one or more changing or dynamic attributes in real-time based on the IRSG and/or programmed changes to an initial IRSG input into the system for target signature development.

In some examples, a laser scanner described herein may be arranged based on the location and orientation of the screen. For example, the laser scanner may be positioned at a predetermined angle relative to the face or front of the screen. For example, the laser scanner can be positioned to direct and scan the laser across the screen at a right angle between the path of the laser and the plane of the screen. In some examples, the angle between the path of the laser and the plane of the screen can be greater than or less than a right angle. In some examples, the angle between the path of the laser and the plane of the screen is dynamic and changes in real time.

Any system described herein may comprise one or more optical devices (e.g., optics) configured to direct and optically adjust the laser beam from the laser (e.g., the IR laser). The optics can be one or more lenses arranged to calibrate, adjust, or otherwise coordinate one or more attributes of the laser beam passing from the laser to the screen.

In some examples, the optics are operably connected and/or positioned between the laser scanner and one or more modulators (e.g., an AOM). The laser beam can transition through the one or more modulators, then through the optics to the laser scanner for deployment or presentation on the screen (e.g., polyimide film).

In some examples, the laser beam from the one or more modulators may be considered a modulated laser beam as it contacts and passes through the optics. The laser beam may be considered a collimated laser beam after it has passed through the optics. For example, any system described herein may comprise optics configured to collimate the laser beam for processing, scanning, and/or transmission of the laser beam by the laser scanner to the screen.

Any system described herein may comprise one or more modulators configured to modulate one or more attributes or characteristics of the laser beam. An example of a modulator may be an acousto-optic modulator (AOM), Bragg cell and/or an acousto-optic deflector (AOD). For example, an AOM may be configured to modulate diffraction, intensity, frequency, phase, polarization, etc. o a laser beam passing therethrough. uses the acousto-optic effect to diffract and shift the frequency of light using sound waves (usually at radio-frequency). In some examples, the AOM may be configured and/or selected based on the required speeds of modulation. In some examples, a system described herein may operate without (e.g., not comprise) an AOM. For example, the function of an AOM controller may be incorporated into one or more other elements of the system (e.g., a controller used to control the scanner).

In some examples, any system described herein may comprise an AOM with beam-dump configured to adjust the intensity of the laser in real-time corresponding to the radiance intensity of the IRSG video pixel. In some examples, an AOM may be configured to provide modulation frequencies greater than 200 MHz.

In some examples, any system described herein may comprise one or more lasers. A laser, as described herein may be configured to generate and/or emit energy (e.g., a laser beam). In some examples, the laser may emit a beam based on parameters and/or instruction from an image processing system, as described herein. For example, the laser beam may be based on the image processing system determining the orientation, arrangement and/or configuration of the IRSG input.

In some examples, the laser may be an uncooled laser system. The laser may generate or otherwise emit a laser of a predetermined wattage (W). For example, a laser beam may be 1 W, 5 W, 10 W, 20 W, 30 W, 40 W, 50 W, 60 W, 70 W, 80 W, 90 W, 100 W or greater. In some examples, the laser beam may be any watt between 0 W and 200 W. For example, a single, uncooled 10.6 um laser (80 W or less).

Any system described herein may comprise one or more controllers. For example, a dynamic infrared scene generation and projection system may comprise a single controller configured to control the angular position of an optical laser-scanner and/or the intensity of the single laser corresponding to the radiance location and intensity from the IRSG video (e.g., input image).

In some examples, one or more controllers may comprise a hardware controller configured to receive device control data from the image processor system and control one or more system hardware components (e.g., laser scanner, modulator, laser, fans etc.). For example, a hardware controller may receive device control data configured to operate one or more fans in communication with the screen (e.g., polyimide film).

In some examples, the image acquisition system described herein may comprise a thermal imager configured to acquire an image (e.g., a target signature) presented on the screen. For example, the thermal imager can be a LWIR FLIR camera systems. In some examples, the thermal image grabber (e.g., camera systems) can comprise and/or be configured with spectral band, resolution, frame rate and digital video interfaces based on the system FGU.

In some examples, the image acquisition system (e.g., FLIR camera systems) may operate within a spectral band range. In some examples, the spectral band range may be between 4 µm to 30 µm. In some examples, the spectral band range may be between 8 µm and 14 µm, In some examples, the spectral band range may be any range sufficient for image acquisition and processing as described herein.

In some examples, the thermal imager (e.g., image acquisition system) may have a field of view at least 5 degrees, at least 10 degrees, at least 15 degrees, at least 20 degrees, at least 25 degrees, at least 30 degrees, at least 35 degrees, at least 40 degrees, at least 45 degrees, at least 50 degrees or great. In some examples, the thermal imager may have a field of view at any degrees between 1 and 100 or greater. In some examples, the thermal imager (e.g., the image acquisition system) may be configured and/or capable of radiometry functionality.

In some examples, a thermal imager described herein may be capable of acquiring, observing and/or registering an image or thermal signature having a temperature between ambient and +1000° C. In some examples, a thermal imager described herein may be configured to acquire, observe and/or register an image or thermal signature having a temperature greater than 10° C., greater than 50° C., greater than 100° C., greater than 500° C. and/or any temperature therebetween.

In some examples, any system described herein may comprise an uncooled microbolometer thermal imager. One or more filters may be associated with the thermal image and configured to protect the thermal imager from laser reflectance. For example, a notch filter (e.g., a 10.6 um notch filter) may be arranged to protect the thermal imager from laser reflectance back into the camera detector elements. In some examples, any system described herein may comprise a frame-grabber configured to continuously capture the camera images at the frame rate of the IRSG.

In some examples, the thermal imager may be arranged at an angle relative to the screen and/or the laser scanner. For example, the thermal imager can be positioned at an angle relative to the screen to acquire a thermal image presented on the screen by the scanning from the laser scanner. In some examples, any system described herein may comprise a thermal imager in operable communication with the FGU and the screen. One or more filters may be disposed between the thermal image grabber and the screen to protect the thermal imager.

Any system described herein may comprise an image processing system (e.g., an image processor). An image processing system, as described herein, may function as an initial image processor configured to process an IRSG image and/or video input. For example, a desired target signature may be developed (e.g., using IRSG physics-based development algorithms) and submitted to the image processor. The image processor may refine the image. For example, pixels may be adjusted or corrected based on intensity errors. In some examples, the IRSG input image may then be transmitted to a scanner driver. For example, frame data associated with the IRSG input image after being corrected may be transmitted to a scanner driver. The scanner driver may comprise an AOM driver configured to receive the adjusted pixel data associated with the corrected IRSG input image. After the image data has been processed by the AOM driver and/or the scanner driver, the image data is transmitted to one or more controllers (e.g., a hardware controller) to influence and instruct operation of one or more hardware components of the system.

Any system described herein may comprise an image processing system (e.g., image processor) operably connected or in communication with a thermal imager (e.g., image acquisition system). In some examples, the image processing system may be the same as the initial image process system. In some examples, the image processing system may be separate or secondary to the initial image processing system. An image processing system in communication with the thermal imager may comprise a frame grabber in communication with the thermal imager and configured to obtain one or more frames acquired from the thermal imager. The frames may be transmitted to an image adjuster (e.g., image pixel correction component) and continue through the image processor components in a similar manner as described above (e.g., via the scanner driver and/or the AOM driver to the hardware controller).

In some examples, any system described herein may operate based on signature-producing (e.g., IRSG signal-products) technologies comprising thermal-reflective technology, thermal-emissive technology, thermal-fluorescent technology, and/or a combination thereof. For example, any system described herein may produce a target signature in a thermal-emissive manner. A screen, of any system described herein, may radiate heat after being contacted with energy from a light source (e.g., a laser). The emission of heat may be regulated by modulation of the energy from the laser. For example, an intensity, duration, frequency, motion, and/or other configuration of the laser may impact the thermal emission from the screen (e.g., polyimide film) and can be dynamically adjusted to simulate target signature attributes.

In some examples, the thermal-emissive technology can provide a cost-effective and/or expendable target signature for use with live-fire training. Live-fire training may include the use of live ammunition deployed against a screen, as described here. The live ammunition may destroy the screen on contact. Therefore, it may be a substantial benefit to employ thermal-emissive configurations of the screen for cost-effective replacement.

In some examples, the thermal-emissive design utilizes a laser to scan projected imagery onto the target screen (e.g., polyimide film). The screen's polyamide film can heat up as the laser contacts it, and the heated film emits in the LWIR band. In some examples, any system described herein can be calibrated such that the laser can be scanned across the target screen to project a recognizable scene (e.g., a T-72 tank) in the LWIR band.

In some examples, any system described herein is an uncooled system. In some examples, any system described herein is substantially uncooled. In some examples, any system described herein may comprise one or more cooling systems configured to optimize the target signature presented on the screen. In some examples, any system described herein is void of any element cooling systems or components (e.g., cryogenic or chiller coolers, other than fan-based cooling). In some examples, any system described herein is uncooled and configured to dynamically-changing, highly spatially-resolved, high dynamic range target thermal signatures in complex backgrounds with very low-cost, expendable screens for live-fire exercises or other activities where the screen might be routinely damaged or destroyed and need to be replaced at practical cost.

In some examples, any system described herein may comprise a screen cooling system. For example, one or more cooling devices (e.g., fans) may be positioned to cool the screen. For example, a cooling system described herein may configured to direct air flow (e.g., cool) over or at the screen to sufficiently increase the convection coefficient of the screen. In some examples, a cooling system as described herein may be configured to selectively lower an intensity of the laser system within a scene (e.g., target signature) to improve thermally dynamic scene display (e.g. the dissipation of the barrel flare after firing), and/or spatially dynamic scenes.

FIG. 1 shows a schematic diagram of an example arrangement for a dynamic infrared scene generation and projection system. Starting with the development of an IR scene 100. An IR scene may include an image, multiple images, and/or a video (e.g., a sequence of compiled image frames). In some examples, the IR scene may be generated using a physics-based algorithm relating to the subject matter of the IR scene. For example, a vehicle may have a known engine configuration, weapon system, and other thermally active components. Based on a database or library of information about the scene subject, any system described herein may be configured to generate an IR scene input having an initial configuration that is dynamically adjustable based on pre-determined simulated changes in one or more thermal characteristics of the IR scene subject. Once the IR scene has been generated, the image and/or video is submitted to the image processing system 200. The image processing system has one or more components configured to process, correct, modify, enhance, adjust, optimize, modify, or otherwise manipulate the IR scene file for processing. In some examples, the image processing system has an image correction engine that may be configured to adjust of enhance the IR scene image (e.g., adjust or correct pixel values). The data from the corrected image is then transmitted to a scanner driver 215. The scanner driver accepts the error corrected frame data from the IR scene generated image. Additional drivers such as the AOM modulator driver 220 that may receive adjusted pixel data (e.g., adjusted pixel intensity data). In some examples, the drivers may be configured to compile and package data for device control based on the processed image data through the drivers. Here, the device control data is then sent to the hardware controller 225. The hardware controller 225 can be configured to control one or more hardware components based on the device control data output from the image processing system 200. As shown in FIG. 1, the hardware controller is operably connected to the laser scanning system, and in particular to the AOM 310, laser scanner 315, and the IR laser source 320. The hardware controller 225 can control the AOM 310 based on pixel intensity power modulation control, or other relevant pixel data configured to determine the necessary modulation of the laser passing through the AOM. The hardware controller 225 may control power to the IR laser source 320 and pixel position control to the laser scanner 315. The hardware controller 225 is also shown operably connected to a convection fan in some examples of any system described herein.

The laser scanning system example of FIG. 1 illustrates the IR laser source emitting the laser beam towards the modulator, then through the optics 325, then through the laser scanner 315. The laser beam can be modulated by the AOM and collimated by the optics before passing through the laser scanner to the thin-film screen 400. The laser scanner contacts the screen 400 with the scanner adjusted collimated laser beam to generate and present the IR scene. In some examples, the IR scene is dynamically adjustable based on the characteristics of the contact between the laser beam and the screen. For example, longer duration or increased intensity may result in increased temperature at a position on the screen and can be used to depict an increase in thermal activity of the simulated IR scene generated thereon. Finally, an example of the feedback loop system in shown in FIG. 1 whereby a thermal imager 500 acquires a screen emitted thermal image. The thermal imager may be coupled to one or more filters 510 (e.g., a notch filter) that can be configured to protect the thermal imager from the screen emitted thermal image. The thermal imager is operably connected to the frame grabber as a secondary pathway for introduction of the acquired thermal image for validation against the initial IR scene. The acquired thermal image may result in additional and/or adjustments in the processing of the image data that can result in adjustment of laser scanning system components by the hardware controller based on the differences.

Figure 2:
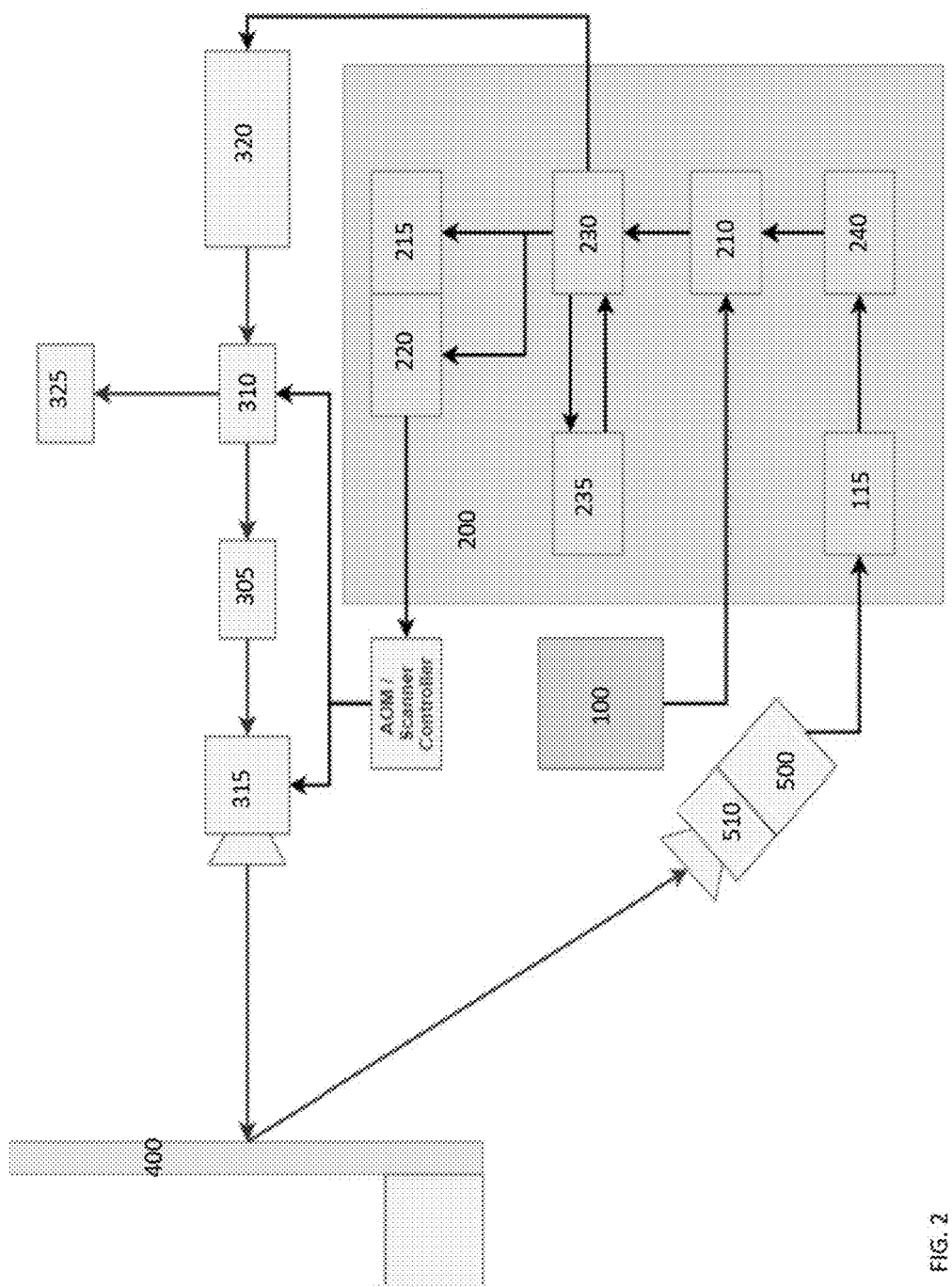
FIG. 2 illustrates a schematic example of an arrangement of system components and an operational flow of generating a dynamic thermal image, as described herein.

FIG. 2 illustrates a similar configuration to FIG. 1 with variations of the controller configuration. Here, in place of the hardware controller, the laser scanner system may be controlled by more than one controller. For example, in FIG. 2, the AOM 310 and the laser scanner 315 are controlled by an AOM/scanner controller, while the IR laser source is controlled by a power overdrive 230 component in the image processing system 200. For example, the power overdrive component may receive data from the pixel correction and initiate the IR laser source 320 upon receipt of the image data. Additionally, the image processing system 200 example in FIG. 2 shows a frame cache component 235 that can be configured to compare against previous frame data and store current frame data. The feedback loop in FIG. 2 illustrates an example of an image registration mechanism 240 that can be configured to register images acquired by the thermal imager prior to subjecting the images to the image processing system for adjustment. Both FIG. 1 and FIG. 2 also illustrate a beam dump component 325 in communication with the AOM and configured to receive waster laser energy after modulation by the AOM.

Figure 3:
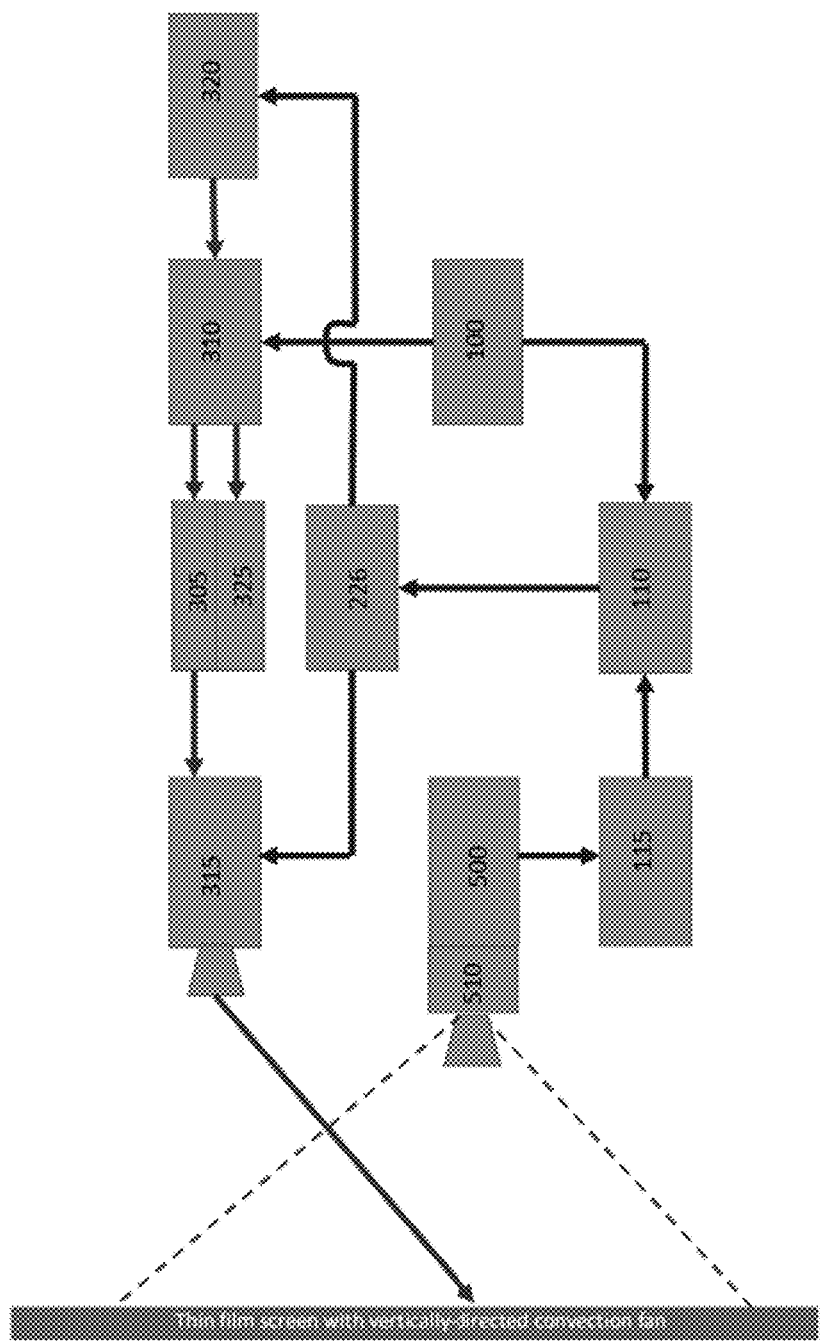
FIG. 3 illustrates a schematic example of an arrangement of system components and an operational flow of generating a dynamic thermal image, as described herein.

FIG. 3 illustrates another arrangement example of a dynamic infrared scene generation and projection system, as described herein. Of note, the laser scanner 315 is illustrated in an offset position relative to the thermal imager 500. Accordingly, the laser scanner 315 may adjust scanning of the image to compensate for the offset position to provide a functional and appropriate orientation of the IR scene to be generated on the screen 400. Also shown in FIG. 3 is the IR scene 100 generation operably connected directly to the AOM 310. The IR scene generator 100 is also coupled to a processor 110 that received data from the IR scene generator and the frame grabber 115. The optic and beam dump 325 are positioned near one another allowing for a parallel direction of the laser from the AOM 310.

Figure 4:
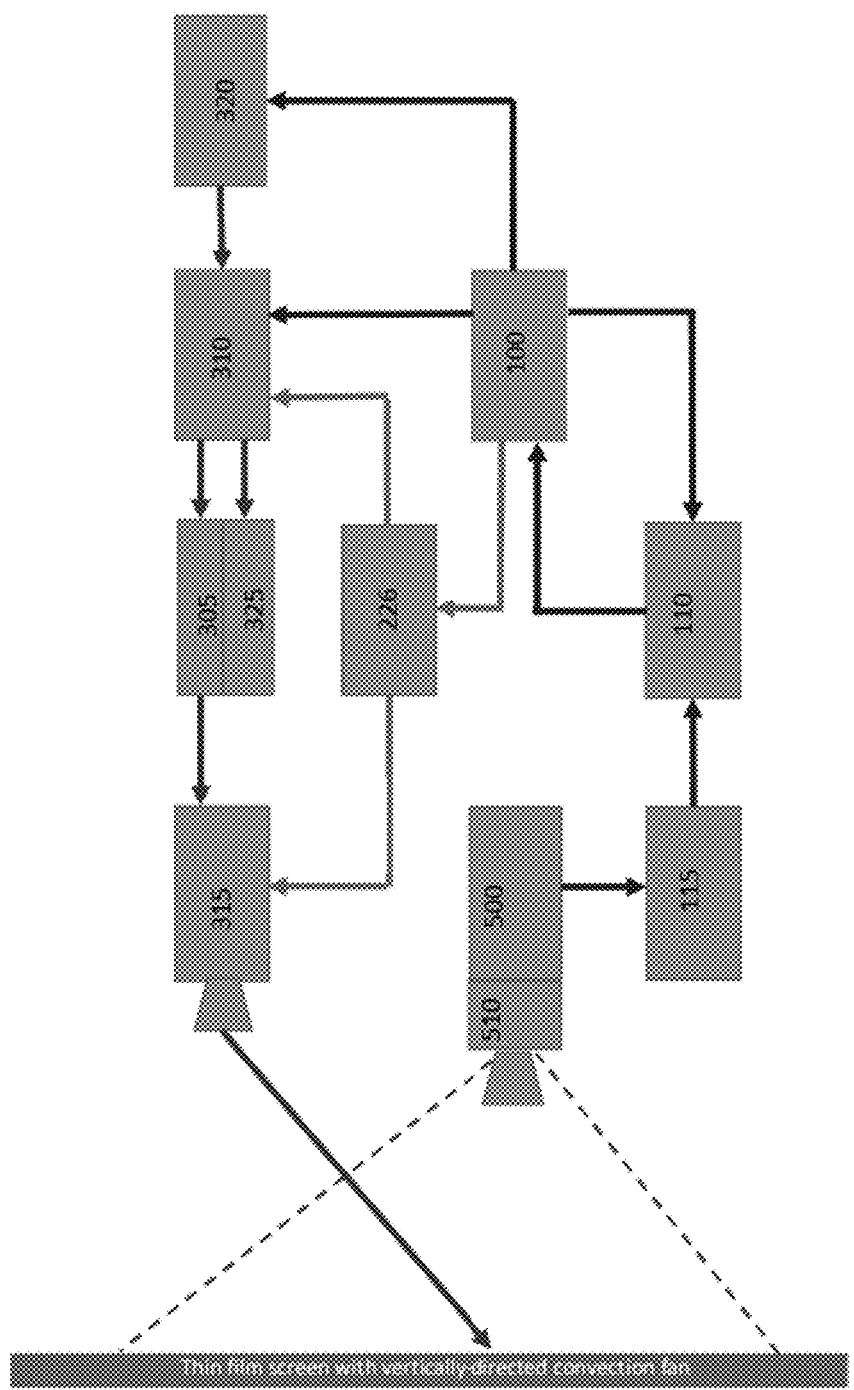
FIG. 4 illustrates a schematic example of an arrangement of system components and an operational flow of generating a dynamic thermal image, as described herein.

Similar to FIG. 3, FIG. 4 illustrates and example arrangement of dynamic infrared scene generation and projection system where the IR scene generator 100 is connected in a loop with the processor 110, whereby pixel correction data is fed back to the IR scene generator for modification. The IR scene generator is also operably connected direct to the IR laser source 320, the AOM 310, and the controller 226. The frame grabber 115 can be configured to transmit acquired thermal image data to the processor and then to the IR scene generator for modification on an initial output from the IR scene generator.

In some examples, the IRSG is based on physics or known attributes, activities, and/or operation of the intended target signature to be generated. For example, a T-72 tank may be the subject of an IRSG and operation of the tank may be input into one or more algorithms associated with the IRSG image generation. Firing sequences, movement, engine operation, users, and any other element that may impact thermal attributes of an intended target signature for IRSG may be considered in the generation of the IRSG image. In some examples, the IRSG is generated using one or more algorithms executable within a computer-based system. For example, parameters of IRSG input target signatures may be provided in a library associated with the target signature to be generated. Based on the parameters, any system described herein may scan an image of a dynamic target signature on the screen based on the thermal characteristics and real-time dynamic changes associated with the simulated target signature function. In some examples, any system described herein may comprises a dynamic physics-based IR scene generator (IRSG) that feeds resolved, high-dynamic range (for example, >=60° C. or greater than 60° C.@12 bits+/−50 bits, high-spatial-resolution 2D/3D radiance video imagery of a target with dynamically-changing thermal signatures in response to the scenario target active states (gun barrel firing, frictional heating of the treads, bogey wheels and drive wheel, engine exhaust, etc.) into the system at less than 30 Hz, 30 Hz, or greater than 30 Hz.

Figure 5A:
FIGS. 5A and 5B are images illustrating examples of dynamic thermal activity of a scene generated by a system described herein.
Figure 5B:
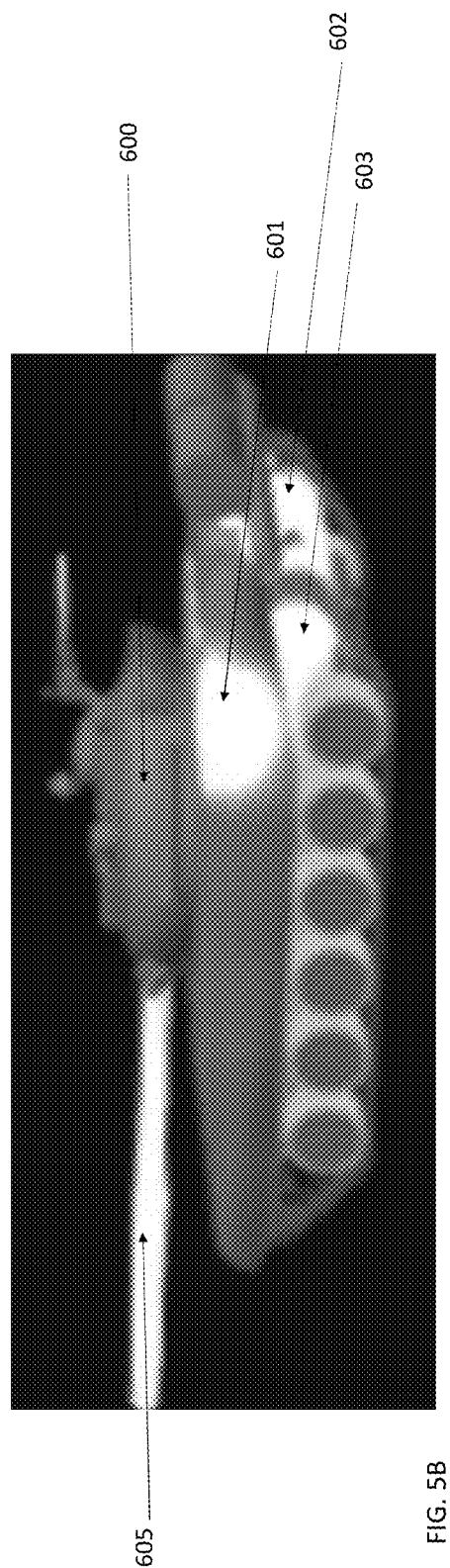
Figure 6A:
FIGS. 6A, FIG. 6B and FIG. 6C are progressive examples of the temporal progression and dynamic thermal change of an IR scene generated by a system described herein.
Figure 6B:
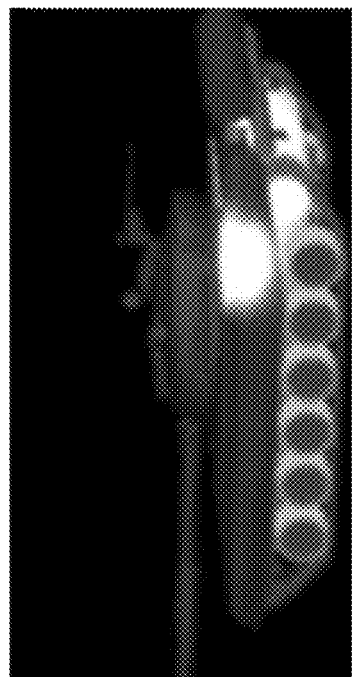
Figure 6C:
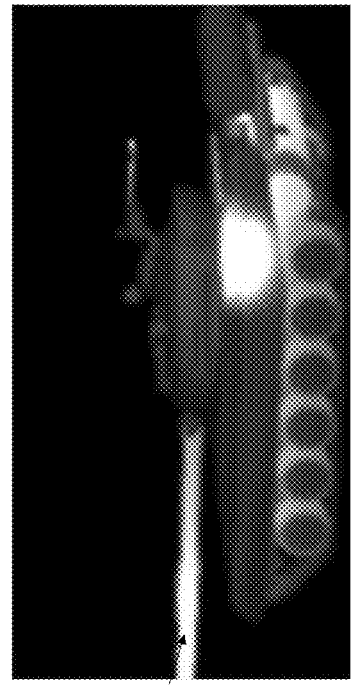
Figure 7A:
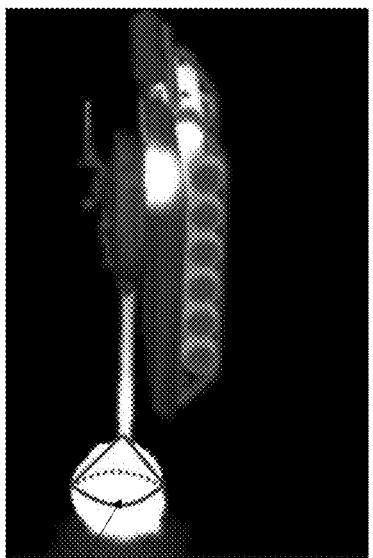
FIGS. 7A to 7D are examples of dynamic thermal transitions over time of a firing sequence simulated by IR scene generated by a system described herein.
Figure 7B:
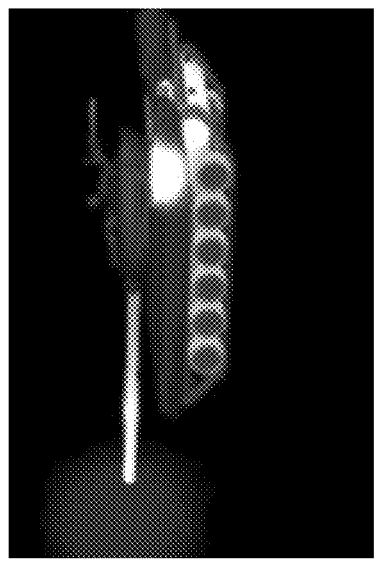
Figure 7C:
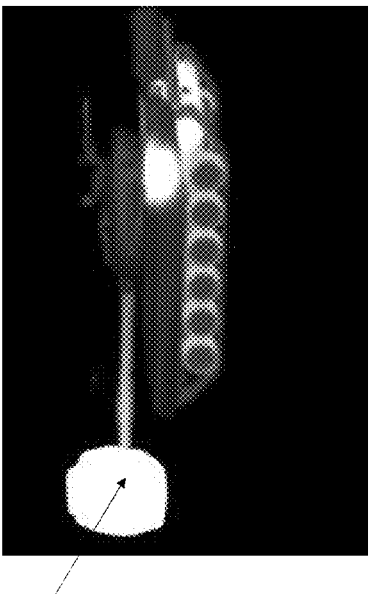
Figure 7D:
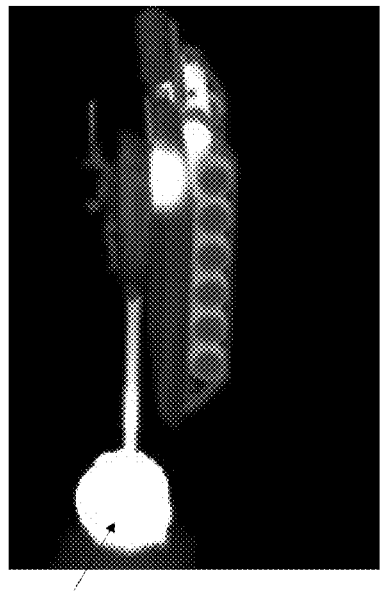

FIGS. 5A and 5B illustrate examples dynamic changes in the thermal attributes of a target signature. In this example, a tank 600 is shown having various thermally active regions (e.g., 601, 602, 602). For example, in FIG. 5A, the rear of the tank 600 is simulated to be bright and would be associated with a thermally active engine. This may provide a strategic targetable region of the tank 600 that can be more susceptible to attack. In FIG. 5B, the barrel 605 of the tank can be seen bright to represent and simulated period during or after the firing sequence where a projectile travels through the barrel and the combustion of the munition combined with the friction have increased the thermal characteristics of the barrel. This capability can provide substantial intelligence on target identification and profiling. Similarly, FIGS. 6A to 6B illustrate another example of a firing sequence that can be generated by any of the systems described herein. The barrel is again simulated as increased thermal characteristics from the barrel 610 in FIG. 6A to the barrel 612 in 6C, the thermal signature in the generated scene of the tank is dynamic through the firing sequence. The engine of the target signature tank can be seen as thermally active in all three images. The dynamic capabilities of any system described herein provide for a specific selectively adjustable dynamic simulation of operation for a realistic target signature that can be appreciated by weapon systems (e.g., heat-seeking weapons systems). The sequence shown in FIG. 6A to 6C shows the dynamic nature of the system (e.g., laser scanner) capabilities to generate an image with varying thermal signatures.

The range of dynamic simulation for an IR generated scene by any system described herein is expansive. FIGS. 7A to 7D illustrate another example of a dynamic transition between period of time for an IR scene generated by any system described herein. In particular, the target signature is again a tank, now shown having fired a projectile. Visually, the heat generated by a tank firing may be difficult to observe. However, any system described herein can be configured and capable of illustrating a firing sequence and residual thermal signatures (e.g., 625, 626, and 627 relating to the residual heat from an expelled projectile).

In some examples, any system described herein operates through a method comprising the function and interaction between one or more hardware components and one or more algorithms. In some embodiments, the step of initialization/image registration comprises the IRSG sends test pattern image to an image processor. A FLIR sends projected test pattern image to image processor. In some embodiments the FLIR is uncooled. The image processor computes and stores an image transformation matrix which auto-registers the IRSG input image with its corresponding (off-axis) projected image; for unambiguous determination of a one-to-one pixel mapping between the two image spaces. The systems described herein can be configured for off-axis lasing.

In some examples, the scene generated (e.g., lased image on the scree) results from the transmission of diffracted beams (e.g., 1st order beams) from an incident beam (e.g., 0th order beam) as redirected by the AOM. The 0th order beam may then be directed to a beam dump after the AOM. In some examples, systems described herein can be configured to reutilize 0th order beam passing from the laser and though an AOM. The reutilization of the 0th order beam can be used to supply additional (e.g., subsequent) 1st order beams for scene/image generation. For example, A 0th order beam utilization system may comprise one or more additional AOMs configured to receive the 0th order beam from previous AOM and redirect additional 1st order beams to an additional collimation element and scanner to be directed and supplied to the screen. In some examples, each pixel in the lased image (e.g., image generated on the screen), may be a percentage of the source (e.g., incident) laser beam that is redirected (e.g., diffracted) by an AOM. For example, the diffracted portion of the beam may be referred to as the 1st order diffraction. The percentage of the incident beam that is diffracted may correspond to the at-screen intensity of the pixel being lased (e.g., 0% for minimum saturation through 100% for maximum saturation). Currently, for each pixel in the lased image, a percentage of the source ("incident") laser beam is redirected ("diffracted") by the AOM; this portion of the beam that is redirected by the AOM is called the 1st order diffraction. The percentage of the incident beam that is diffracted (thus becoming the 1st order diffraction beam) can correspond to the at-screen intensity of the pixel being lased (e.g., 0% for minimum saturation through 100% for maximum saturation). Accordingly, for lased pixels with less than 100% saturation, an inverse, non-zero percentage of the incident beam may not be diffracted. This portion of the beam that is not redirected by the AOM may be referred to as the transmitted beam or 0th order diffraction. In some examples, this 0th order diffraction beam is sent to a beam dump after the AOM.

In some examples, a portion of all lased pixels will may not be fully saturated, meaning a portion of the laser power is sent to the beam dump. Currently, for each pixel in the lased image, a percentage of the incident laser beam is redirected (e.g., diffracted) by the AOM; this portion of the beam that is redirected (e.g., 1st order diffraction). The percentage of the incident beam that is diffracted (thus becoming the 1st order diffraction beam) may correspond to the at-screen intensity of the pixel being lased: 0% for minimum saturation through 100% for maximum saturation. This means that for lased pixels with less than 100% saturation, an inverse, non-zero percentage of the incident beam is not diffracted. This portion of the beam that is not redirected by the AOM is called the transmitted beam or "0th order diffraction." Currently, this 0th order diffraction beam is sent to the beam dump, where it is not used. To recapture the laser power being sent to the beam dump, the system may comprise a secondary optical pipeline that to redirect additional (e.g., subsequent) $1^{st}$ order beam from an AOM to the screen (e.g., via additional collimation element and scanner). Additional beam-recapture systems may be incorporated into the system where additional AOM can be configured to capture and redirect $1^{st}$ order diffraction from the incident beam, first $0^{th}$ order beam, and subsequent $0^{th}$ order beams by having additional AOMs receive the 0th order beam and redirect associated $1^{st}$ order beams to additional collimation elements and scanners. In some examples, subsequent $1^{st}$ order diffraction may be directed to a single collimation element and scanner assembly.

Figure 8:
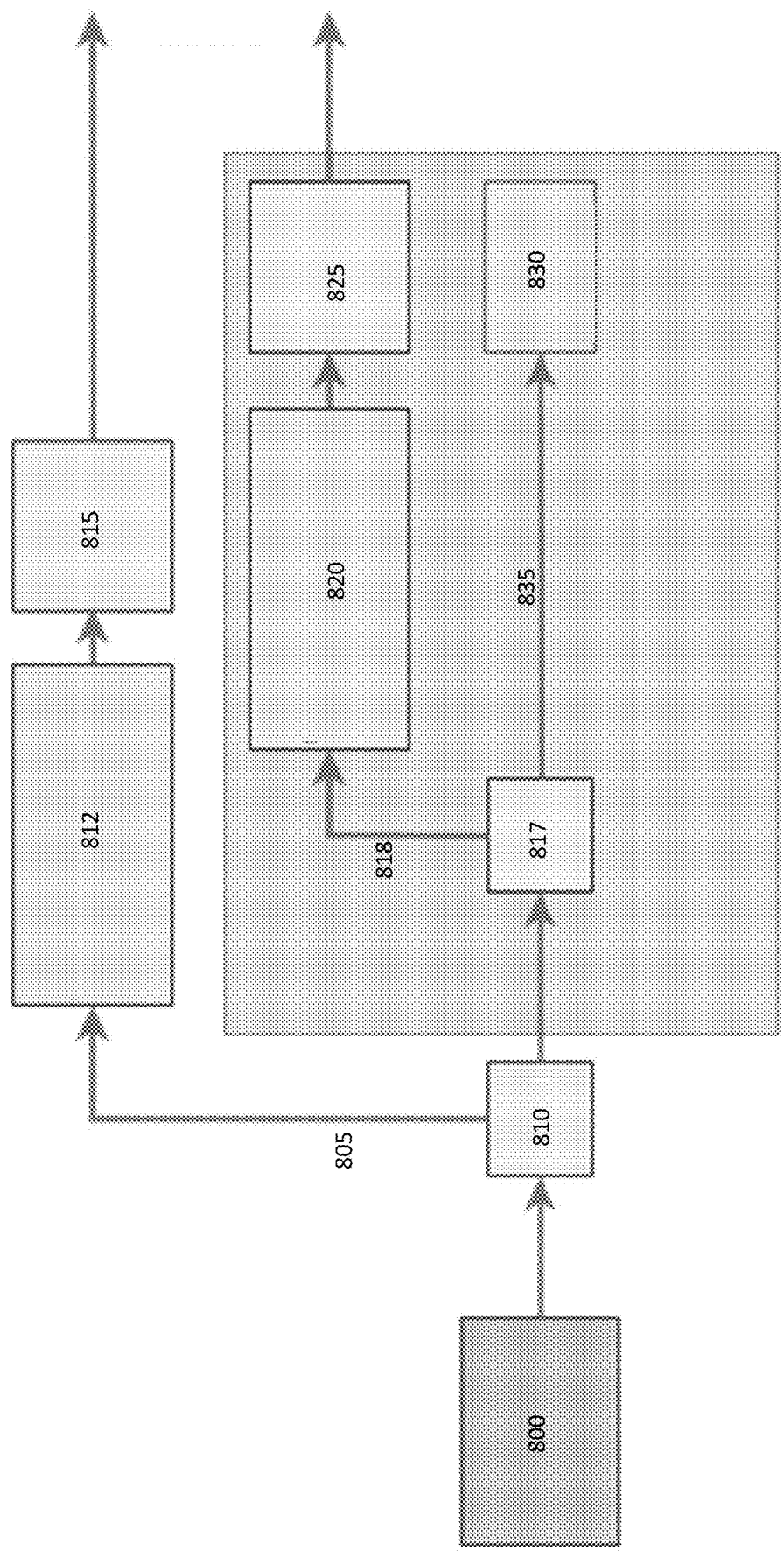
FIG. 8 illustrates a schematic example of an arrangement of system components and an operational flow of generating a dynamic thermal image, as described herein.

FIG. 8 illustrates an example of a beam reutilization system to reuse additional (e.g., subsequent) $1^{st}$ order beams for improved image generation. Here, the laser 800 provides an initial incident beam 805 to a first AOM 810. The incident beam 805 can comprise the $0^{th}$ order beam and the $1^{st}$ order beam. The first AOM 810 redirects the $1^{st}$ order beam 811 to a first collimation element 812 having mirrors and lenses. The $1^{st}$ order beam 811 is then directed to a first scanner 815 and subsequently to a screen for image generation. The $0^{th}$ order beam 816 from AOM 810 is directed to a subsequent AOM 817 where a $1^{st}$ order beam 818 is then redirected to a second collimation element 820 having mirrors and lenses. The $1^{st}$ order beam is then directed to a second scanner 825 and subsequently to the screen for image generation. Although only two AOMs are illustrated in FIG. 8 for beam reutilization, additional AOM, collimation and scanner assemblies may be provided for additional beam recapture. In some examples, multiple AOMs may be configured to redirect $1^{st}$ order beams to a single collimation element. A beam dump 830 may be provided to receive $0^{th}$ order beam 835 from the last AOM (e.g., AOM 817). This would work by replacing the beam dump in the current design with a second AOM. This second AOM would use the 0th order diffraction beam from the first AOM as its incident beam and redirect as much of that beam as possible to the screen via a second scanner.

As described herein one or more algorithms may be configured to coordinate the laser beam or beams sent to the screen. For example, a beam reutilization system may operate according to one or more algorithms configured to coordinate and optimize multiple scan patters (e.g., the two scan patterns as illustrated in FIG. 8) Any of the algorithms described herein or used by the system may be dynamic and versatile to strategically direct the remaining power from the 0th order beam of the first AOM to enhance contrast for hot spots. An example of an algorithm may histogram the intended pixel values into one or more bins (e.g., 10 bins labeled 0-9), in each bin, there may be both left scanner (e.g., first scanner) and right-scanner (e.g., second scanner) pixel positions. Then the algorithm pairs up the intended pixel values in bin (e.g., bin "x") with values from bin 9-x, in such a way that when sorted, the sequence minimizes the deviation from an optimal raster scan pattern for both scanners.

In some examples, a method of generating a dynamic infrared scene can include generation and projection of an associated target signature. The method may comprise first, generating a scene. Generating a scene may comprise determining the desired target signature to be generated and presented. The scene may be generated using one or more physics-based algorithms. Then, using the generated scene to develop corresponding scanner instructions. For example, the IRSG that was first developed may be submitted to the image processing system for data generation to instruct the operation of system hardware in the presentation of the target signature on the screen. The, the laser can be initiated and the laser scanning process can be initiated.

In some examples a method of generating a dynamic infrared scene can include capturing a lased (e.g., laser scanned) imagery with a thermal imager, as described herein. The captured imagery can then be displayed and valuated against the initial scene input. For example, the initial scene (e.g., target) may be compared against the captured image for appropriate homography between the input image and the captured image.

In some examples, the steps of capturing the lased image may be continuously repeated to compare changes in the dynamic presentation of the lased image on the screen. The comparison may support or require modification of one or more hardware components based on the image input from the thermal imager into the image processing system. For example, if a captured image is rejected, the image processing system may adjust instructions to the hardware controller to correct any deficiencies and/or support homology between the IRSG and the captured image. For examples, the instructions form the image refinement/correction loop can be repeated until the program is halted.

In some examples, a method of generating a dynamic infrared scene can include image registration. For examples, a method of generating a dynamic infrared scene can include generating scene in OSV, then developing a scene data based on the generated scene, the data may correspond to scanner instructions. Then, activating the laser and initiating scanning procedure. The method may comprise the feedback loop including capturing lased imagery with thermal imager. Then, applying registration transformation to captured imagery. Then, displaying the registered imagery.

In some examples, adding registration capability to this run loop may require use of a homography (transformation matrix) that can be calculated in advance. In some examples, the run loop for finding this homography can comprise generating input image. Then, developing corresponding scanner instructions based on the generated input image. Then, activating the laser and initiating scanning procedure. Then, capturing lased imagery with thermal imager. Then, saving captured imagery. Then, validating and/or registration the image by comparing input image against reference image. After a valid registration has been found, the homography in that registration can be stored and applied to any other image captured by the thermal imager from the same position.

In some examples, any system described herein may comprise operational methods associated with a continuous error feedback loop comprises: the IRSG generating dynamic 2D radiance imagery corresponding to the physics-based predicted at-object signature of the 3D target and corresponding background, for the user-specified scenario weather, atmosphere, target dynamic state (e.g., engine state, motion state/frictional heating, etc.), time of day, time of year, etc. These 2D radiance images are fed to the image processor for passing along to the AOM, which modulates the beam intensity passing through the optics to the scanner, on a pixel-by-pixel basis. The uncooled FLIR images received by the IR thermal imager are captured by the frame grabber, converted to radiance images of the same format as those coming from the IRSG, and sent to the image processor for comparison. The image processor automatically performs image registration using the transformation stored during initialization, and then compares the two images (original from IRSG and projected from frame grabber), generating a 2D radiance difference map. This difference map is then applied to the next frame of synthetic imagery from the IRSG as a correction, and the result passed to the AOM for beam modulation.

In some examples, prior to the pixel-by-pixel raster scanning of each image frame, the laser scanner's scan angle and the AOM's modulation fraction can be coordinated within the scanner driver (i.e. software). This may ensure that the beam intensity corresponding to a particular scan angle (screen position) spatially correlates with the proper input image pixel. Accordingly, the hardware controller can coordinate raster scanning.

In some examples, a feedback loop for any system described herein may comprise driving per pixel corrections to the IRSP image within a specified threshold, accommodating image responses corresponding to dynamic state changes of the simulated vehicle.

In some examples, environmental (e.g., field-based) influences may cause anomalies and complications in the IRSG target signature. Accordingly, any system described herein may comprise adjustment and refinement of any of the components and/or associated hardware configurations to account such environmental influence. For example, a laser scanner and modulator (e.g., AOM) can be controlled iteratively to adjust the effective laser power and scanning pattern for desired production of a spatial radiometric thermal emission sent to it by a scene generation unit (e.g., a Chimaera Scene Generation Unit). Any adjustment in response to environmental influences on the target signature production can be sufficient to address and calibrate relative to the negative impact of environmental influence on the target signature produced on the screen by any system described herein.

In some examples, a closed-loop system as described herein may comprise a scene generation unit (SGU) (e.g., a Chimaera SGU), a laser scanning modulation system (LSMS), a LWIR FLIR camera, and (4) Frame Grabber Unit (FGU) (e.g., an image acquisition system such as a Chimera FGU). In some examples, the FGU may comprise and or operate with Radiometric Adjustment Feedback Software (RAFS).

In some examples, a method of generating a dynamic infrared scene can include generation and projection of an associated target signature including a closed-loop feedback system with steps comprising sending desired synthetic target/background radiometric image to the LSMS and FGU RAFS with the SGU. Then, the LSMS accepting the SGU image and controls the laser power and scan pattern to form the thermal emissive pattern. Then, LWIR FLIR can constantly sense the thermal signature of the screen (e.g., at 30 Hz) and relay it to a frame grabber card in the FGU. Then, the FGU capturing the FLIR images (e.g., at 30 Hz). Then, the FGU RAFS differences the SGU-requested image and the FLIR/FGU-captured image to form a delta matrix (per pixel gain and level array). Then, the FGU can send the delta matrix to the SGU to apply to the desired target thermal emission image.

In some examples, the closed feedback loop method can then repeat at each frame update (e.g., at each 30 Hz frame update), thereby iteratively maintaining the correct radiometric signature, even in the presence of environmental influences on the screen.

In some examples, a closed loop system described herein adjusts one or more system components and/or associated component configurations. For example, an image is generated, run through the closed loop system for comparison against the input image, then, an algorithm considers differences between the generated image and the input image. Based on the differences, either the elements may be physically adjusted in position relative to the film; and/or the laser adjusts the image generation according to the results of the closed loop system comparison the adjust the image generation and correct for defects.

In some examples, the closed loop system may include identifying one or more regions or elements (e.g., key points) within an image (e.g., an input image/output image) to relate or align the output image and the input image. For example, to correctly determine the transformation that is used to register an image, there may be need for one or more (e.g., at least 4 key points) corresponding key points from each image. More key points may result in a better transformation.

Figure 9:
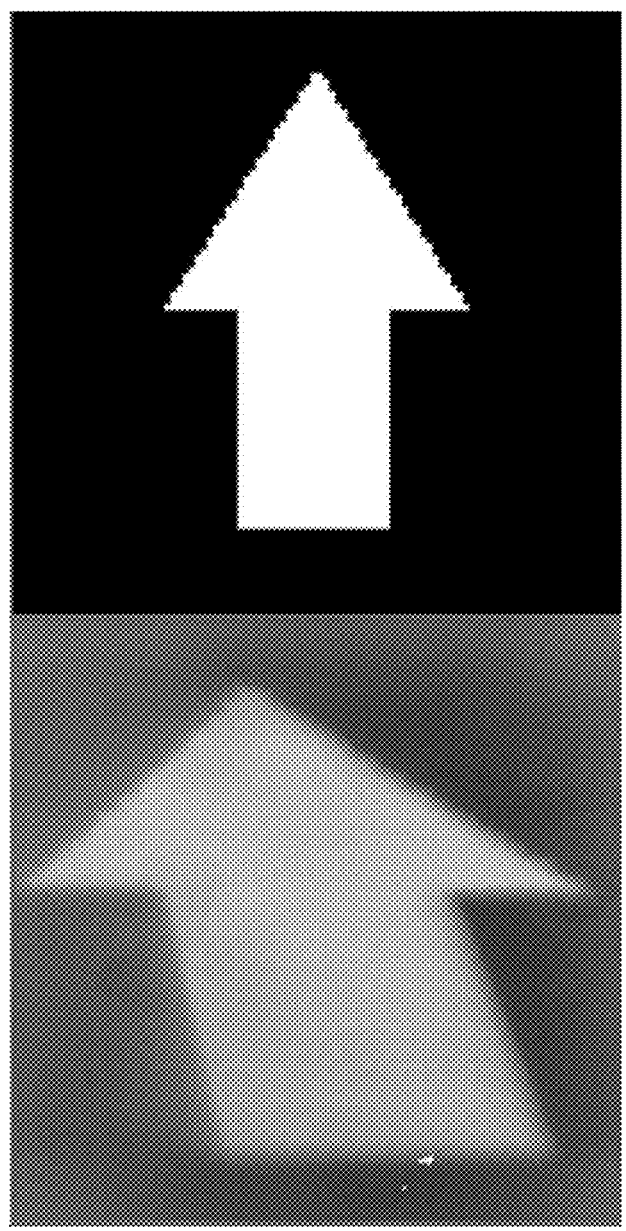
FIG. 9 is an example of the adjustment capabilities associated with a feedback loop system of a dynamic IR scene generation system described herein.

For example, FIG. 9 illustrates an example of adjustment of an image generated by any system described herein. For example, the image on left may be the image presented on the screen after initial IR scene generation and laser scanning. A thermal imager may be configured to acquire the thermal image (e.g., the image on the left) and input associated data into the image processing system for adjustment. According to the data from the processed acquired thermal image, the image processing system can be configured and adjust the controller, which in-turn can adjust one or more components of the laser scanner system to correct and optimize the image, as illustrated by the corrected image on the right.

In some examples, the key point selection is optimized based on corresponding keypoints were correct mathematical best-matches based on their descriptors. In some examples, the key points are fiducial markers are classified as reference points in an imaging system that can be used for measurement (QR codes and barcodes are common examples).

In some examples, a method of generating a dynamic infrared scene can include generation and projection can comprise a registration algorithm comprising detecting and describing one or more keypoints of one or more images. Then, eliminating one or more keypoints below a defined threshold of their descriptors. Then, comparing one or more remaining keypoints from each image. Then, calculating the homography using corresponding points. Then, applying the homography to the input image to align it with the reference image.

In some examples, any system described herein may perform a method including the dynamic heating or transition of thermal changes for a target signature simulation presented on the screen. For example, the OSV scene can be configured to highlight only activated thermal regions at start state were the tank's engine and exhaust. Then, over a period of time, the scene can be updated in real-time to heat the wheels and then the artillery. For example, the first 10 seconds, the only active thermal regions are the engine and exhaust, and then the wheels are activated and allowed to heat up for another 10 seconds. Then, the artillery begins to heat up. This dynamic heating can provide a simulated function and strategic targeting opportunities for weapons systems being trained.

In some examples, any system described herein may comprise a housing configured to house one or more of any of the system components. For example, a housing may be configured to house the laser, laser scanner, one or more modulators, image acquisition system, image processing system components, optics, etc.

In some examples, any system described herein is configured to generate and present a dynamic IR scene (e.g., target signature) on a screen for use with live firing training or operations. Any system described herein may comprise a hit detection system associated with live firing weapons training. For example, a target signature may be presented on a screen (e.g., polymide film) based on contact from a laser beam that has been modulated after a laser device has received instructions from an image processing system based on a generated or desired IR scene input. The target signature may include one or more dynamic elements (e.g., a heating barrel, engine and/or tires) that may be considered in the weapons training for strategic targeting. A weapons system may be configured to acquire the target signature in a manner similar to target acquisition of a real (e.g., non-simulated/non-generated target) and deploy ammunition to the screen in a similar manner to deploying ammunitions on a real target. The screen may be destroyed as a result of the live fire training and replacement of the screen can allow the system to re-present another target signature.

In some examples, any system described herein is configured to generate and present a dynamic IR scene (e.g., target signature) on a screen for use with non-live firing training or operations. Any system described herein may comprise a hit detection system associated with non-live firing weapons training. Non-live firing training or operations may comprise the use of weapons targeting systems and/or other target acquisition systems and methods that can provide for acquisition of a target and simulated deployment of munitions. For example, a target signature may be presented on a screen (e.g., polyimide film) based on contact from a laser beam that has been modulated after a laser device has received instructions from an image processing system based on a generated or desired IR scene input. The target signature may include one or more dynamic elements (e.g., a heating barrel, engine and/or tires) that may be considered in the weapons training for strategic targeting. A weapons system may be considered to acquire the target signature in a manner similar to target acquisition of a real (e.g., non-simulated/non-generated target) and deploy an acquisition element (e.g., a laser guidance system, radar, sonar, etc.) to the screen in a similar manner to acquiring a real target. The screen may respond to the weapon targeting system to indicate a hit or positive acquisition of the target. For example, one or more radio frequency sensors (RF), identification system (e.g., IFF identification system friend or foe), electromagnetic (EM), IR sensor and/or other sensory systems may be in operable communication with any system described herein. The one or more sensory systems may be configured to register or otherwise identify activity of the target acquisition system relative to the target signature presented on the screen. An alert or other form of indication relating to the positive acquisition of the target signature by the target acquisition system may be triggered. Alternatively, where the target acquisition system fails to acquire the target signature presented on the screen, a negative acquisition feedback may be provided by a system described herein.

Figure 10:
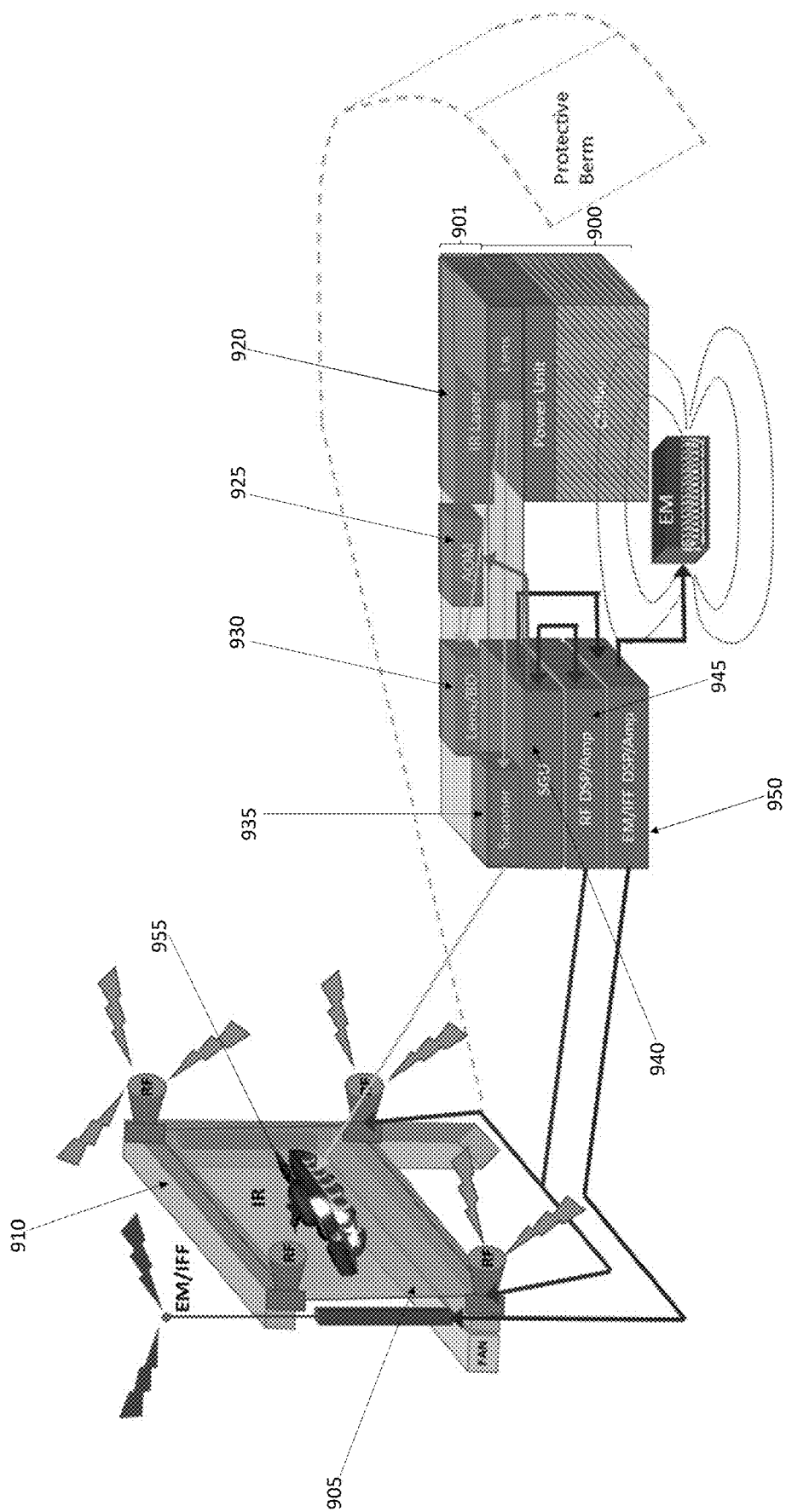
FIG. 10 illustrates a schematic example of an arrangement of system components and an operational flow of generating a dynamic thermal image, as described herein.

FIG. 10 illustrates an example of a dynamic infrared scene generation and projection system having the hit detection system 900 in operable communication with the screen 905 on the frame 910. An example of an IR scene generation system 901 having the IR laser 920, AOM 925, collimation element 930 and laser scanner 935 may be used with the hit detection system, or without. FIG. 10 illustrates an example of the hit detection system 900 and IR scene generation system 901 as a combined unit. In this example, the hit detection system 900 has a screen grabber unit (SGU) 940, RF DSP/Amp 945, EM/IFF DSP/Amp 950 configured to be in operable communication with the frame and screen to detect a hit or acquisition of a target or element generated on the screen by the IR scene generation system 901. In some examples, one or more sensors of the hit detection system can be configured to detect a hit or other engagement of the target signature on the screen. In some examples, the thermal imager can depict, and the system may be configured to simulate damage based on the specific characteristics of the detected hit. In some examples, a protective berm may also be part of the IR scene generation system and hit detection system to protect against damage from live ammunition directed towards the generated scene 955.

In some examples, any system described herein include a hit detection system configured to detect and indicate or otherwise provide real-time information relating to the efficacy and/or damage delivered by the weapon system used on the target signature. For example, the image acquisition system may be configured to acquire an image and/or data related to damage and/or the impact of the weapons system deployed on the target signature (e.g., presented on the thin-film screen). The image capture system may transmit acquired/observed results of the weapon system impact on the target signature to the image processing system, which can be configured to provide simulated details of an impact by the weapon system.

In some examples, any system described herein can comprise additional sensors, electrical interfaces, software interfaces, etc which can be configured to monitor the state of the hardware components and provide control mechanisms. For example, the system may comprise additional capabilities for auto-shut-off of hardware when the hardware is sensed to be operating outside of safe operation parameter boundaries.

The systems described herein may further comprise, or be in communication with monitoring systems for environmental factors (e.g., weather conditions. For example, the system may comprise a weather station configured to monitor environmental conditions (e.g., temperature, humidity, wind speed & direction, cloud cover/irradiance). The system can integrate the environmental conditions and may adjust corresponding electrical and software interfaces to the scene generation system for operation characteristics. For example, the system may adjust one or more hardware components or settings based to ensure current background conditions (e.g., environmental conditions) can be appropriately simulated on the screen. In some examples, environmental conditions may be interpreted by the system to improve the prediction, accuracy and representation of the effect of convection on screen response time.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Any system described herein may comprise one or more power sources or power systems operably connected to one or more or any components requiring power for operation. Controllers, modulators, regulators, may be included as necessary or beneficial for the functional operation of the system and/or any of the system components.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A dynamic infrared (IR) scene generation system comprising:
    a thin-film screen configured to react to contact by an IR laser;
    a laser scanning system configured to contact the thin-film screen with IR laser power, the laser scanning system comprising an IR laser source, one or more acousto-optic modulators, a laser scanner; and
    image processor operably connected to a hardware controller configured to control the laser scanning system, wherein the laser scanning system is configured to contact the thin-film screen with the IR laser based on an IR scene input from the image processor, wherein the acousto-optic modulator is configured to direct a beam from the IR laser source to a collimation member before the IR laser contacts the thin-film screen.

2. The system of claim 1, further configured to validate a thermal target signature acquired by a thermal imager, wherein the thermal target signature is a dynamic scene based on the thin-film screen reaction to contact by the IR laser.

3. The system of claim 1, wherein the image processor is configured to correct one or more pixel intensities of a IR scene input, wherein the image processor comprises one or more drivers configured to generate data based on the IR scene input, wherein the hardware controller is configured to control the laser scanning system based on the data.

4. The system of claim 1, further comprising a thermal imager operably connected to the image processor, the thermal imager configured to acquire one or more images from the thin-film screen, wherein the one or more images are configured to be adjusted by the hardware controller based on adjustment data from the image processor, wherein the adjustment data is associated with the one or more acquired images.

5. The system of claim 3, wherein the laser scanning system is configured to generate one or more thermally dynamic images on the thin-film screen, wherein each of the one or more thermally dynamic images is targetable by a weapon system.

6. The system of claim 1, wherein the thin-film screen is a multilayer screen comprising one or more layers of thin film and one or more coating layers contactable by the IR laser, and a fabric backing configured to dissipate heat from the laser transmitted through the thin-film screen.

7. The system of claim 2, further comprising a hit detection system in operable communication with the thermal imager, the hit detection system comprising one or more radio frequency sensors, one or more electromagnetic sensors, or one or more identification sensors.

8. The system of claim 1, wherein the laser scanning system is uncooled.

9. A method of dynamic infrared (IR) scene generation with an uncooled collimated laser, the method comprising:
    generating an IR scene input;
    generating data with an image processor, wherein the data is based on the IR scene input;
    initiating a laser scanning system comprising a laser scanner, wherein a hardware controller directs operations of the laser scanning system based on the generated data;
    contacting a thin-film screen with a laser beam directed by the laser scanner; and
    generating a target signature on the thin-film screen, wherein the laser scanner scans the laser beam on the thin-film screen based on the IR scene input.

10. The method of claim 9, further comprising:
    acquiring a thermal image emitted by the thin-film screen with an IR thermal imager;
    validating the acquired thermal image against the IR scene input, wherein if the acquired thermal image fails validation, the method further comprises processing the acquired thermal image with the image processor and adjusting one or more system components based on adjustment data generated by the image processor, the adjustment data based on the processed thermal image.

11. The method of claim 9, wherein the IR scene input comprises a predetermined sequence of one or more simulated dynamic adjustments to one or more regions of the IR scene input, wherein the one or more simulated dynamic adjustment is based on one or more changes in simulated thermal activity of the generated IR scene input.

12. The method of claim 11, further comprising repeating the method in a sequence based on one or more predetermined adjustments in the IR scene input.

13. The method of claim 9, further comprising modulating the laser beam with an acousto-optic modulator, and passing the modulated laser beam through one or more optics before contacting a thin-film screen with a laser beam directed by the laser scanner.

14. The method of claim 10, wherein the IR scene input is a video comprising sequential frames, wherein the thermal imager acquires the sequential frames from the video target signature.

15. The method of claim 14, wherein the acquired sequential frames are validated after all of the sequential frames are acquired, wherein the method further comprises the thermal imager storing sequential frames acquired from the IR scene input video target signature.

16. The method of claim 10, further comprising detecting a hit with one or more sensors in operable communication with the thin-film screen, wherein a hit is detected when a weapon system acquires the target signature.

17. The method of claim 10, further comprising the hardware controller adjusting operation of the laser scanning system, wherein the target signature is validated against the IR scene input, wherein the operation of the laser scanning system is adjusted until the target signature passes validation.

18. The method of claim 10, further comprising redirecting a 1st order beam from a laser source configured to generate the laser beam, with at least one acousto-optical modulator to a first collimation element, wherein the collimation element directs the 1st order beam to the laser scanner.

19. An uncooled dynamic infrared (IR) scene generation system comprising:
- a thin-film screen configured to react when contacted by an IR laser;
- an IR laser source configured to emit the IR laser;
- a first acousto-optic modulator configured to direct a 1st order diffraction from the IR laser to a collimation element;
- a laser scanner configured to direct the 1st order diffraction to the thin-film screen; and
- image processor operably connected to a hardware controller configured to control the laser scanner, wherein the 1st order diffraction is scanned on the thin-film screen according to an IR scene input from the image processor.

* * * * *